Dec. 3, 1929.  B. AMES  1,737,820
MOTOR
Filed May 28, 1928  2 Sheets-Sheet 1
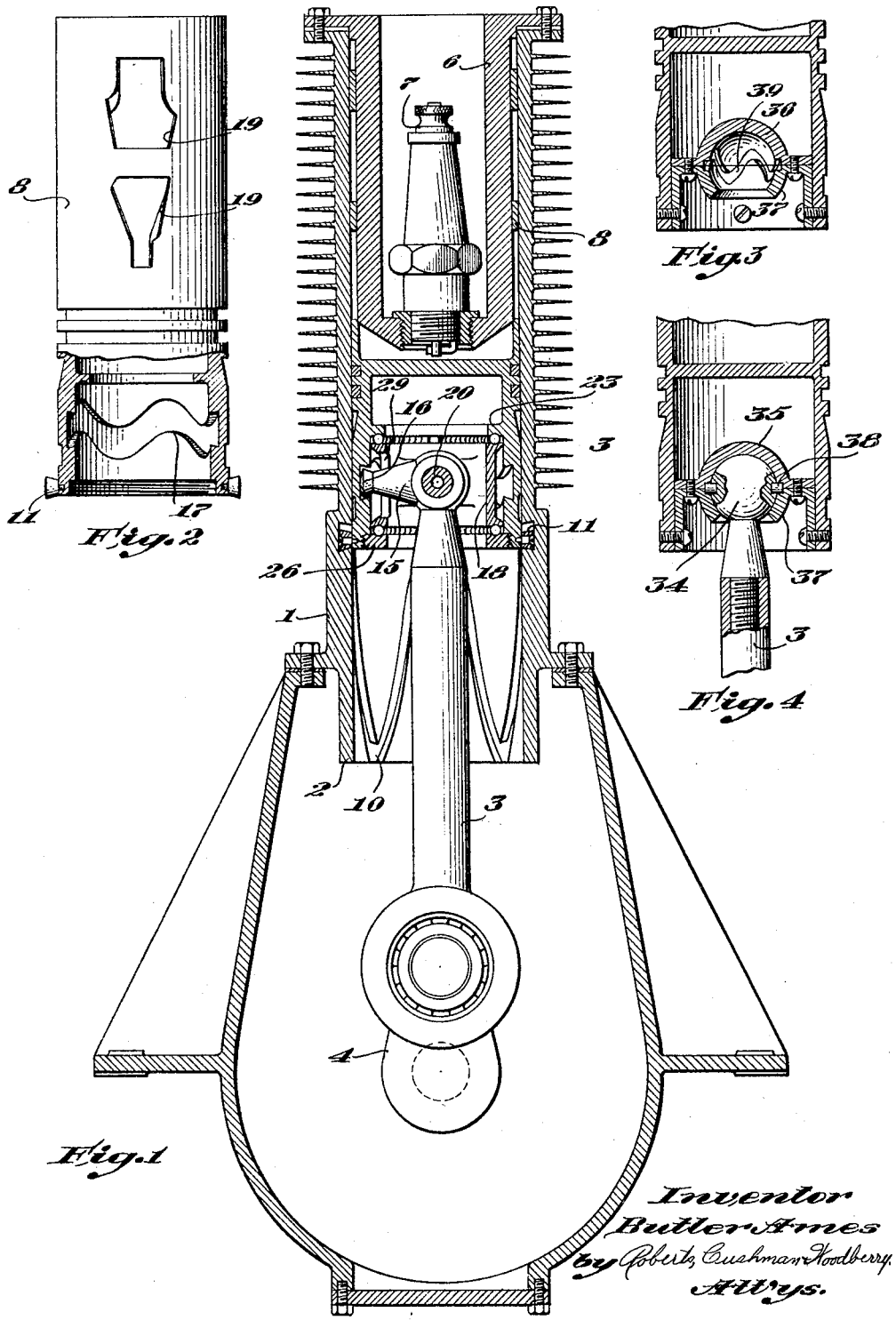

Dec. 3, 1929.  B. AMES  1,737,820
MOTOR
Filed May 28, 1928    2 Sheets-Sheet 2

Inventor
Butler Ames
by Roberts, Cushman & Woodberry
Attys.

Patented Dec. 3, 1929

1,737,820

UNITED STATES PATENT OFFICE

BUTLER AMES, OF LOWELL, MASSACHUSETTS

MOTOR

Application filed May 28, 1928. Serial No. 281,251.

This invention relates to reciprocating apparatus, such as steam or internal combustion engines, compressors, pumps or the like, of the general type which are characterized by a piston that rotates about its cylindrical axis while reciprocating along a path parallel with said axis, and by means of suitable ports in the cylinder and piston respectively functions as a valve member to control the intake and exhaust of fluids. An engine of this general type is illustrated in Letters Patent of the United States Nos. 1,363,547 and 1,363,548, while the same general type of apparatus is also shown in my application Serial No. 93,907, filed March 11, 1926, allowed June 1, 1927 and forfeited December 1, 1927, of which the present application forms a substitute in part and consequently is a renewal in part.

By way of illustration of the invention herein described, I take for an example a motor which, like that shown in my Patent No. 1,363,548, employs an extension portion of the piston as the fluid control valve member, and accordingly I refer the reader to Patent No. 1,363,548 for an explanation of the structural character and general functional relationships of the parts of motors of this type. As set forth in my Patent No. 1,363,548, the chief object of that invention described therein was to secure a rotation of the piston valve member at an angular velocity in constant ratio with the angular velocity of the engine shaft, in other words, to eliminate from the rotative movement of the piston valve all accelerations and retardations within the cycle of one rotation thereof.

One of the objects of the present invention is to provide a simplified mechanism by which such a constant ratio of angular velocity may be obtained. The present invention is further adapted to provide means of this character wherein the means for imparting rotation to the piston valve are arranged to have a minimum of unnecessary friction and to be readily cooled and lubricated, being protected from the gases of combustion or the like.

In the drawings hereto annexed, which illustrate the principles of my invention and the manner in which a motor embodying the same will operate, Fig. 1 is a cross sectional view in a plane coincident with the axis of an engine cylinder showing the construction of a motor according to the preferred form of my invention;

Fig. 2 is the view of a piston with parts broken away and parts in section;

Fig. 3 is a sectional view of a portion of a modified form of piston;

Fig. 4 is a sectional view of a portion of the piston shown in Fig. 3 showing the connecting rod assembled in the operative engagement with the piston;

Figure 5:
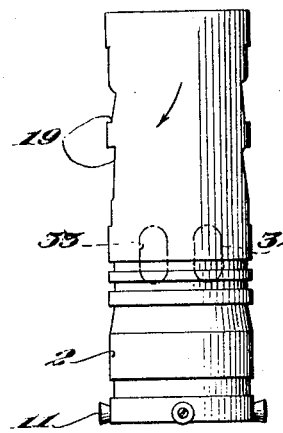
Fig. 5 is an elevational view of the piston with the position of the ports in the cylinder wall indicated in dotted lines, the piston occupying this position at the beginning of the explosive stroke.
Figure 6:
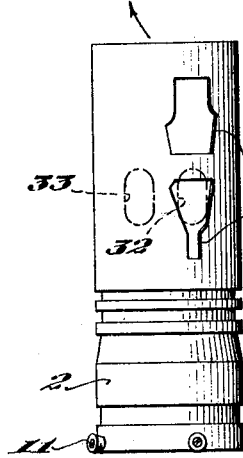
Fig. 6 is a similar view of the piston with the ports indicated in dotted lines showing the former in the intermediate portion of the exhaust stroke.
Figure 7:
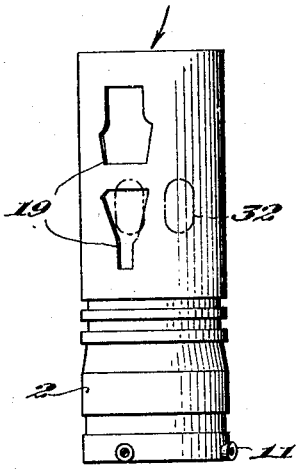
Fig. 7 is an elevational view of the piston with the ports indicated in dotted lines showing the former in approximately the position it occupies during the mid portion of the inlet or intake stroke.

Referring to the accompanying drawings, and more particularly to Fig. 1 thereof, the numeral 1 designates the cylinder of a motor of the preferred type which may have a reciprocating piston 2 connected by a rod 3 to the crank shaft 4. The cylinder is provided with a reentrant head 6 in which is located a suitable spark plug 7. An integral sleeve portion 8 of piston 2 is received between the reentrant head and the adjoining portion of the piston wall. The assembly of the crank shaft and the lower end of the connecting rod may be conventional.

The piston 2 is adapted to be rotated in relation to the cylinder and the connecting rod, a suitable bearing member or shell 18 being interposed between the connecting rod upper end and the piston to permit relative movement therebetween. In order to rotate the piston at a substantially uniform angular velocity or at a constant ratio to the angular velocity of the crank shaft, I provide two cam and follower factors each characterized by having a sinusoidally curved path defined by a cam groove of sinusoidal form provided with a suitable cooperating follower. One of these cam and follower factors is designed to impart rotary movement from the cylinder to the reciprocating piston, while the other cam and follower factor is designed to impart rotary movement to the piston from the oscillating upper end of the connecting rod.

Fig. 1 illustrates the configuration of the lower portion of the cylinder wall which may conveniently extend downwardly below the upper portion of the crank case. The inner surface of this portion of the cylinder wall is provided with a sinusoidally curved cam groove 10, which has diametrically opposed pairs of upper and lower dwell portions corresponding to the upper and lower dead centers of the crank or, in other words, the ends of the reciprocating movement of the piston. The piston skirt carries followers 11 which may correspond in number to the number of upper or lower dwells in the groove 10. These followers preferably may be in the form of frusto-conical rollers 11 carried upon suitable pins projecting radially from the piston skirt, it being noted that the tapered configuration of these rollers permits movement of the same in engagement with suitably inclined sides of the cam groove so that a true rolling motion is permitted without slipping or sliding and consequent friction and wear.

In the preferred embodiment of the invention, as shown, there are four upper and lower dwells in the cam groove so that each follower may pass two upper and two lower dwell portions corresponding to the upper and lower ends of two strokes of the piston during each complete cycle of a four-cycle motor. It is evident, however, that the number of dwells and consequently the ratio of piston and crank shaft rotational speed may be varied; for example, there may be two upper and two lower dwells so that the piston will rotate once for each two revolutions of the crank shaft rather than once during each four revolutions of the crank shaft. The provision of a cam groove of the character shown is advantageous, however, since it results in a reduction in the rotational speed of the piston, and since it permits the provision of oppositely disposed ports in the piston and a resultant pneumatic balance.

In the approved form of my invention, the members of the other cam and follower factor comprise a projecting arm 15 upon the connecting rod with a follower roller 16, which is also frusto-conical or tapered, disposed at the outer end of the pin and engaged in the sinusoidally curved groove 17 upon the inner face of the piston skirt. The wrist pin 20 about which the connecting rod oscillates is disposed in a suitable bearing member or shell 18 which has an opening 29 at one side through which the end of arm 15 may extend. The piston is provided with an internal annular flange 23 and a threaded retaining ring 26 which cooperate with the adjoining ends of member 18 to comprise races for the reception of annular rows of bearings, whereby rotation of the piston about the connecting rod and shell 18 is facilitated. To permit convenient assembly of the piston and connecting rod the upper end of the latter may be threaded into the main part thereof, as illustrated more specifically with reference to the modified form of the invention shown in Fig. 4.

In the example herein shown of a four-cycle internal combustion engine, the piston valves should rotate at an angular velocity one quarter that of the crank shaft, this speed ratio being consistent with the four maxima and minima of the sinusoidal cam groove 10. It will be apparent, however, that when the reciproacting of the members of the engine are at either top or bottom dead center, the cam groove 10 will be exerting no rotative impulse upon piston 2, whereas at one-half stroke in either direction the followers 11 will be receiving a maximum rotative impulse. It is therefore essential to provide secondary means for supplying rotative impulse to the piston when it is at or near either of its dead points. This means is provided by the cam and follower factor associated with the piston and connecting rod upper end.

Figure 8:
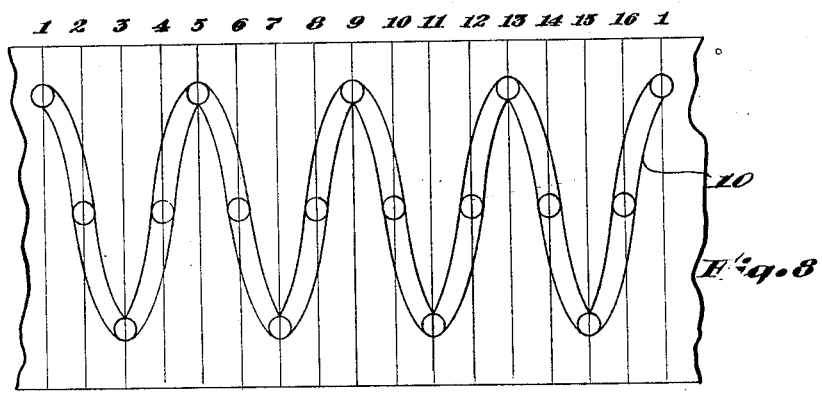
Figs. 8 and 9 are diagrammatic illustrations of the geometrical development of the cam grooves of related parts of the motor.
Figure 9:
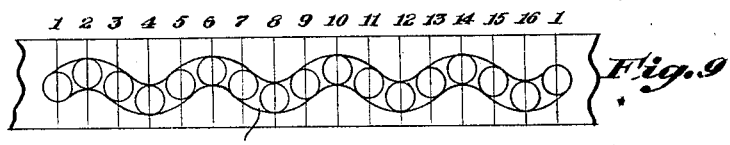
Figure 10:
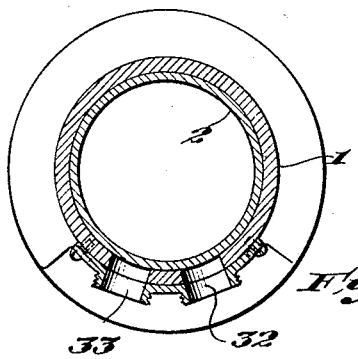
Fig. 10 is a horizontal section through the cylinder showing the position of the ports in the cylinder wall.
Figure 11:
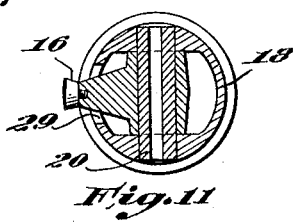
Fig. 11 is a horizontal section through the piston, wrist pin, and related parts.

As diagrammatically indicated in Figs. 8 and 9, it is to be understood that the sinusoidal groove 17 is adapted to have a maximum ordinate dimension corresponding to the path of oscillation of pin 16 about the wrist pin as a center, and it will be further evident that the maximum rotative impulses derived from pin 16 may be obtained when the latter is in the mid portion of its path between the dwells of cam groove 17 or, in other words, when arm 15 and follower 16 are in the position shown in Fig. 1, either at top or bottom dead center. The followers are so disposed in relation to the respective cam grooves that the maxima or minima dead points of one cam groove will correspond with the maximum inclination or throw of the other cam groove, whereby the aggregate effect of the rotative impulses received by the piston from the cylinder and from the connecting rod will result in a substantially uniform angular velocity of the piston or, in other words, each cam groove and follower carries the piston over the dead point of the other cam groove.

The sleeve 8 of piston 2 is provided with ports 19 adapted to register with ports 32 and 33 in the cylinder wall in the same general manner as disclosed in the above-identified patents, although the ports 19 of the present invention are shaped somewhat differently to provide the desired valve timing.

Figs. 3 and 4 show a modified form of articulate connection between the connecting rod and piston wherein the rod 3 is provided with a ball 34 at its upper end which is swiveled in a socket 35 formed by a pair of cooperating members 36 and 37 secured within the piston. In this case a plurality of suitably disposed pins 38 and a cooperating sinusoidally curved groove 39 in socket 35 are adapted to compose the secondary cam and follower factor between the piston and connecting rod upper end, while the ball and socket joint also performs a function equivalent to that of the wrist pin and its bearings in the preferred embodiment of the invention.

It is evident that in the arrangements above described, which are characterized by the position of the two cam and follower factors arranged as disclosed, the parts can at no time be at a complete dead point position. As the rotative impulses of one cam and follower factor declines, that of the other increases, the maximum of one coinciding with the minimum of the other. The aggregate torque received from the two members is therefore substantially uniform. On account of the momentum acquired by the rotating piston very little restorative impulse is required to maintain its angular velocity of rotation while a dead point is being passed; consequently, there is very little load and very little wear upon the members of these two factors.

The relative position of the two followers in their cam grooves at various parts of the cycle is diagrammatically illustrated in Figs. 8 and 9 in which the plurality of stations numbered 1 to 16 are adapted to correspond to the various dead points and points of maximum connecting rod throw in the operation of a four-cycle internal combustion motor. For example, at station 1 the piston is at top dead center, or, in other words, the rollers 11 are in the upper dwells of groove 10, while the follower 16 is at the point of maximum throw in the groove 17. At station 2 the followers 11 have moved to a position half way down, a position wherein they are located at the part of the cam groove corresponding to the maximum throw thereof, while member 16 has attained a dead point position in the groove 17. Stations 3, 5 and 7 represent the succeeding lower and upper dead centers of the piston connecting rod, while stations 4, 6 and 8 represent the respective succeeding dead center positions of the pin 15. While it is obvious that groove 17 rotates in relation to groove 10, the curves presented by Figs. 8 and 9 represent the relative development of the paths of pins 13 and 16 at various points of the cycle and when read together serve to aid the visualization of the mode of providing substantially uniform torque for the rotating piston or valve member by the means disclosed herein.

While the illustrated embodiment of my invention shows the same as applied to an internal combustion engine, it is obvious that the same principles are generally applicable to reciprocating steam engines, to compressors and other apparatus characterized by a reciprocating piston action and the entrance and egress of fluid through valves or ports.

I claim:

1. In apparatus of the type designated, a cylinder, a connecting rod and a piston rotatively articulated with the connecting rod, two cam and follower factors, the coactive members of one fixed with relation to the piston and cylinder respectively, the coactive members of the other fixed with relation to the piston and connecting rod respectively, the dwells of one cam and follower factor synchronizing with the throws of the other.

2. The subject matter of claim 1 further characterized by a bearing member within the piston which receives the upper end of the connecting rod and has a normally rotatable connection with the piston.

3. The subject matter of claim 1 further characterized in that a bearing member is provided to receive the upper end of the connecting rod and have the piston rotatably carried thereon and that one cam and follower factor has its members carried by said bearing member and the adjoining part of said piston.

4. The subject matter of claim 1 further characterized in that one of the cam and follower factors is provided between the piston and the upper end of the connecting rod.

5. The subject matter of claim 1 further characterized by the fact that one of the cam and follower factors is provided by the upper end of the connecting rod and an adjoining part of the piston, said factor comprising sinusoidally curved surfaces cooperating with a suitably shaped follower.

6. The subject matter of claim 1 further characterized by the fact that one of the cam and follower factors is provided by the upper end of the connecting rod and an adjoining part of the piston, said factor comprising a sinusoidal groove which receives a suitably shaped follower.

7. The subject matter of claim 1 further characterized in that a bearing member is provided to carry a wrist pin at the upper end of the connecting rod and has the piston rotatably mounted thereon, and in that one cam and follower factor comprises a projecting arm upon the connecting rod upper end, a follower on said arm which projects through an opening in the bearing member and a suitably shaped cam groove in an adjoining part of the piston to receive said follower.

8. In apparatus of the class described, means for supplying rotative impulse to a sleeve rotatably mounted in a cylinder, said means comprising a pair of sinusoidal cam elements and cooperating followers, the maxima and minima of one of the elements being operatively located substantially to correspond with the position of the follower at the maximum throws of the other cam.

9. In apparatus of the class described, means for supplying rotative impulse to a sleeve rotatably mounted in a cylinder, said means comprising an oscillatable element upon the upper end of the connecting rod and a cooperating cam groove upon the adjoining inner wall of an extension of the sleeve.

10. In apparatus of the class described, a cylinder, a connecting rod, and a piston rotatively articulated with the connecting rod, means for continuously rotating the piston comprising two driving factors, one of which is adapted to impart rotative movement to the piston from a cooperative part of the cylinder and the other of which is adapted to impart rotative movement from an adjoining oscillating portion of the connecting rod.

11. Apparatus of the class described comprising a cylinder, a crank, a piston, reciprocable and rotatable in the cylinder, a connecting rod imparting movement from the crank to the piston, said piston being pivotally connected to the connecting rod, two cam and follower factors to impart rotary movement to the piston, the coactive members of one being provided upon the upper end of the connecting rod and the adjoining piston portion, the coactive members of the other being arranged upon the piston skirt and adjoining portion of the cylinder, valve ports in said cylinder, and an upward extension of the piston having openings to register with said ports.

12. Apparatus of the class described comprising a cylinder, a crank, a piston reciprocable and rotatable in the cylinder, a connecting rod imparting movement from the crank to the piston, a shell within the piston pivotally secured to the connecting rod, said piston being rotatively mounted upon the shell, two cam follower factors to impart rotary movement to the piston, the coactive members of one being provided upon the upper end of the connecting rod and the adjoining piston portion, the coactive members of the other being arranged upon the piston skirt and adjoining portion of the cylinder, valve ports in said cylinder, and an upward extension of the piston having openings to register with said ports, one of said cam and follower factors comprising a substantially sinusoidally curved surface, and antifriction means engaging said surface.

13. Apparatus of the class described comprising a cylinder, a crank, a piston reciprocable and rotatable in the cylinder, a connecting rod imparting movement from the crank to the piston, a shell within the piston pivotally secured to the connecting rod, said piston being rotatively mounted upon the shell, two cam and follower factors to impart rotary movement to the piston, the coactive members of one being provided upon the upper end of the connecting rod and the adjoining piston portion, the coactive members of the other being arranged upon the piston skirt and adjoining portion of the cylinder, valve ports in said cylinder, and an upward extension of the piston having openings to register with said ports, one of said cam and follower factors comprising a pair of frusto-conical rollers and a substantially sinusoidally curved groove with inclined edges to engage said rollers.

14. In apparatus of the character designated, a cylinder, a sleeve rotatably mounted in the cylinder, means for reciprocating the sleeve, means for imparting rotary movement to the sleeve, said means comprising a pair of substantially sinusoidal cam elements and cooperating followers the maxima and minima of each of the cam elements being operatively located to correspond to a follower position in engagement with the other element between its maxima and minima, whereby at least one of the cam elements is always operative to cause rotation of the sleeve upon reciprocation of the same.

15. Apparatus of the type designated comprising a cylinder, a connecting rod and a piston rotatively articulated with the rod, and mechanism arranged to impart rotary movement to the piston, said mechanism including cam means provided with rise portions separated by dwells, followers engaging the cam means, said followers being disposed in synchronized relation to each other and the cam means so that at least one of the followers is always engaging a rise portion of the cam means, whereby torque may be continuously supplied to the piston.

16. Apparatus of the type designated comprising a cylinder, a connecting rod and a piston rotatively articulated with the rod, and mechanism to impart rotary movement arranged to the piston, said mechanism including cam means provided with rise portions provided with portions of maximum inclination merging into dwells, followers engaging the cam means, said followers being disposed in synchronzed relation to each other and the cam means so that at least one of the followers is engaging a rise portion of maximum inclination when one of the other followers is disposed adjoining a dwell portion of the cam means, whereby substantially uniform torque may be supplied to the piston.

Signed by me at Lowell, Masachusetts this 24th day of May, 1928.

BUTLER AMES.